(12) United States Patent
Tiffany, III et al.

(10) Patent No.: US 9,765,902 B2
(45) Date of Patent: Sep. 19, 2017

(54) SANITARY HIGH PRESSURE AERATOR VALVE ASSEMBLY

(71) Applicant: Control Concepts, Putnam, CT (US)

(72) Inventors: Henry D. Tiffany, III, Juneau, AK (US); Paul S. Rose, Sanibel, FL (US); Aaron G. Hall, North Grosvenordale, CT (US); Daniel S. Smith, Woodstock, CT (US)

(73) Assignee: Control Concepts, Inc., Putnam, CT (US)

( * ) Notice: Subject to any disclaimer, the term of this patent is extended or adjusted under 35 U.S.C. 154(b) by 0 days.

(21) Appl. No.: 15/261,634

(22) Filed: Sep. 9, 2016

(65) Prior Publication Data

US 2017/0066589 A1   Mar. 9, 2017

Related U.S. Application Data

(60) Provisional application No. 62/215,963, filed on Sep. 9, 2015.

(51) Int. Cl.
  *F16K 15/02* (2006.01)
  *F16K 31/122* (2006.01)
  *F16K 15/06* (2006.01)

(52) U.S. Cl.
  CPC ........ *F16K 31/1221* (2013.01); *F16K 15/063* (2013.01)

(58) Field of Classification Search
  CPC .......................... F16K 31/1221; B65D 88/706
  USPC .......................... 137/536, 541, 542
  See application file for complete search history.

(56) References Cited

U.S. PATENT DOCUMENTS

| | | | | |
|---|---|---|---|---|
| 1,449,446 | A | * 3/1923 | Reed | B67D 7/42 137/542 |
| 3,550,625 | A | 12/1970 | Adams, Jr. | |
| 3,788,527 | A | 1/1974 | Matson | |
| 3,961,561 | A | * 6/1976 | Knutson | F15B 9/10 91/378 |
| 6,237,893 | B1 | 5/2001 | Rose et al. | |
| 2014/0070126 | A1 | 3/2014 | Robinson | |

OTHER PUBLICATIONS

PCT/US2016/051147 Written Opinion, Jan. 19, 2017.

* cited by examiner

*Primary Examiner* — Craig Schneider
*Assistant Examiner* — P. Macade Nichols

(57) ABSTRACT

A sanitary high pressure valve assembly is provided. The valve assembly includes an inlet adaptor for admitting pressurized gas into a sanitary central passageway for release into a storage vessel containing granular material for the purpose of aiding flow of the granular material from the storage vessel. The valve assembly also includes an isolation chamber for housing serviceable parts that are isolated from the sanitary central passageway.

16 Claims, 17 Drawing Sheets

SANITARY HIGH PRESSURE AERATOR VALVE ASSEMBLY

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith:

U.S. provisional patent application 62/215,963 entitled "Sanitary High Pressure Aerator Valve", filed 9 Sep. 2015.

BACKGROUND

1. Field of Use

This invention relates generally to a valve construction for releasing a relatively large volume of pressurized gas into a storage vessel containing granular material and the like for the purpose of accelerating the flow of said granular material therefrom and more particularly to modifying such valve construction for improved operation.

2. Description of Prior Art (Background)

Discharging particulate material from an opening in a storage vessel is sometimes troublesome because of clogging, bridging, rat-holing or sticky build-up of the particulate material on the vessel walls, which can occur anywhere in the vessel but usually occurs near the discharge outlet of the vessel. This clogging is often aggravated when the particulate material is moist or contains additives that make it sticky. Numerous attempts have been made in the past to alleviate this problem. For example, it has been proposed to mount one or more gas discharge devices on the vessel walls or sloping sides of hoppers containing particulate material. Such discharge aid devices have a nozzle extending into the hopper for directing a blast of gas into the hopper to reduce clogging and bridging of the material contents so that the material can be discharged by conventional gravity or to assist other unloading equipment as disclosed in U.S. Pat. No. 3,788,527. While such prior art discharge aid devices, such as air blasters or air pulsing, have met with varying degrees of commercial success, the devices all have open discharge ends which are subjected to particulate material and fines entering into the devices via said openings and fouling the internal mechanisms and rendering the devices partially or completely inoperative. This shortcoming of the prior art devices necessitates shutdowns for costly repair, cleaning and loss of production.

Also by the nature of construction for said prior art devices, close tolerances of the internal piston member to the surrounding outer housing are necessary for these air blasters to operate efficiently. This creates a problem where temperature changes in the surrounding environment can cause binding between parts having different thermal expansion coefficients, thereby causing eventual operational failure. These temperature variations can be seasonal or daily, caused by changing environmental conditions, or created by the industrial processes involved.

A related serious problem occurring with operation of these prior art valve constructions is that of contaminating the stored particulate material with metal pieces derived from the valve itself or its mounting plate, such as weldment bits.

An aerator valve of this type now in wide commercial use has also been developed having fewer moving parts than disclosed in the aforementioned prior art patent. Unfortunately, said modified valve construction still remains prone to much of the above noted operational difficulties attributable at least in part to having critical components fabricated with weldments. Basically, said modified valve construction includes an outer housing with front and back ends terminating a central inner passageway, a movable piston member slidably engaged within the central passageway in said outer housing, a spring loaded piston guide member affixed within the central passageway in said outer housing intermediate the front and back ends, and a pneumatic valve mechanism supplying a pressurized gas medium to drive the piston member forward unseating the front end of said passageway and releasing the pressurized gas to the surrounding atmosphere. In constructing said commercial valve device, the piston member is designed with an enlarged head termination sealing the front end of the central passageway and with said member having been formed with multiple component parts joined together by conventional welds. More particularly, a machined rod is employed which is threaded into and welded to a separate enlarged head portion of said member and with the enlarged head portion further terminating with a welded end cap. Still further welding of a metal compression spring to the spring loaded piston guide member employed in said valve construction occasions frequent device failure during valve operation accompanied by introducing weld fragments into the storage vessel where employed.

To overcome the aforesaid operational difficulties with this type valve device, there is now provided an improved pneumatic powered gas discharge valve construction having few internal parts and which can still further be affixed to assorted storage vessels in an improved manner. In doing so, the present valve device can be connected to a high flow pulse type electric solenoid valve for installation on one or more storage vessel side walls to direct repeated pulses of the pressurized gas medium being released between the particulate material being stored and the inner vessel wall. Multiple installations of the presently improved valve device are contemplated with individual valves being equally spaced about the side walls of said storage vessel when desired. Affixing of the presently improved valve construction to a storage vessel side wall or multiple side walls has also been simplified for cost reduction and required maintenance or valve removal. More particularly, the prior art valve installations customarily employ a flat mounting plate coupled to another flat mounting flange in order to physically secure the valve device to the vessel side wall and with the vessel side wall often having a curved contour requiring considerable welding to accomplish such manner of joinder. As distinct therefrom, the presently improved valve construction enables joinder of said valve device to the vessel side wall with a novel weld-on mounting collar.

It is an object of the present invention, therefore, to provide an operationally improved gas powered discharge aid device having fewer non-welded internal working parts.

It is another object of the present invention to provide said presently improved gas discharge device in a manner requiring only a relatively simple modification of the component parts.

A still further object of the present invention is to provide improved means whereby the presently improved gas discharge device can be physically secured to the side walls of a storage vessel.

It is yet another object of the present invention to provide a novel cooperation between the presently improved gas discharge device and the mounting means whereby said device can be physically secured to a storage vessel side wall.

These and still further objects of the present invention will become apparent upon considering the following detailed description of the present invention.

BRIEF SUMMARY

The invention is directed towards a sanitary high pressure aerator valve assembly. The sanitary high pressure aerator valve assembly includes a main body having substantially collinear opposite ends; a coupling collar attachable one end of the main body; an end cap attachable to an end opposite of the coupling collar end; and an inlet adaptor attachable to the main body, wherein the inlet adaptor is substantially perpendicular with the substantially collinear opposite ends. The main body also includes a sanitary central inner passageway for introducing pressurized gas into a vessel when the pressurized gas is sufficient to overcome a compression spring holding a piston head in a closed position. Additionally, the assembly includes an isolation chamber for housing serviceable parts and is isolated from the sanitary central passageway.

The invention is also directed towards a sanitary high pressure aerator valve assembly having a main body having substantially coaxial opposite ends. A coupling collar is attachable to one end of the substantially coaxial opposite ends and an end cap is attachable to the end opposite of the coupling collar end. In addition, an inlet adaptor is attachable to the main body, wherein the inlet adaptor is substantially perpendicular to the substantially coaxial opposite ends. The sanitary high pressure aerator valve assembly also includes an air chamber comprising a central passageway disposed between the inlet adaptor and the coupling collar end; and there are no non-aerodynamic parts disposed within the central passageway which may be prone to capturing material.

In accordance with one embodiment of the invention a directional sanitary high pressure aerator valve assembly is included. The directional sanitary high pressure aerator valve assembly a main body includes an outlet port having a circular opening; a cap end; and an inlet port. An air chamber comprising a central passageway is disposed between the inlet port and the outlet port. The directional sanitary high pressure aerator valve assembly includes a directional adapter disposed towards the outlet port within the central passageway and directs pressurized gas or air towards predetermined sections of the outlet port.

In accordance with another embodiment of the present invention a sanitary high pressure aerator valve assembly is provided. The sanitary high pressure aerator valve assembly includes a main body having a circular outlet port, a cap end; and an inlet port. An air chamber comprising a central passageway is disposed between the inlet port and the outlet port; and wherein there are no non-aerodynamic parts disposed within the central passageway which might trap material (e.g., organic material). The sanitary high pressure aerator valve assembly includes an air chamber isolation assembly for isolating the central passageway from the cap end, wherein the air chamber isolation assembly includes a spring guide; a spring guide O-ring disposed around the spring guide; and a wiper seal abutting the spring guide. The sanitary high pressure aerator valve assembly also includes a one-piece unitary piston member slidable for a predetermined distance within a portion of the central passageway coaxial with the main body coaxial ends. The one-piece unitary piston member includes an enlarged head disposed at one end of the one-piece unitary piston member for sealing the coupling collar end of the air chamber; and a threaded length end disposed at an end opposite the enlarged head end; and wherein the threaded end is isolated from the central passageway by the air chamber isolation assembly.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example; and If the specification states a component or feature "may," "can," "could," "should," "preferably," "possibly," "typically," "optionally," "for example," or "might" (or other such language) be included or have a characteristic, that particular component or feature is not required to be included or to have the characteristic.

Figure 1:
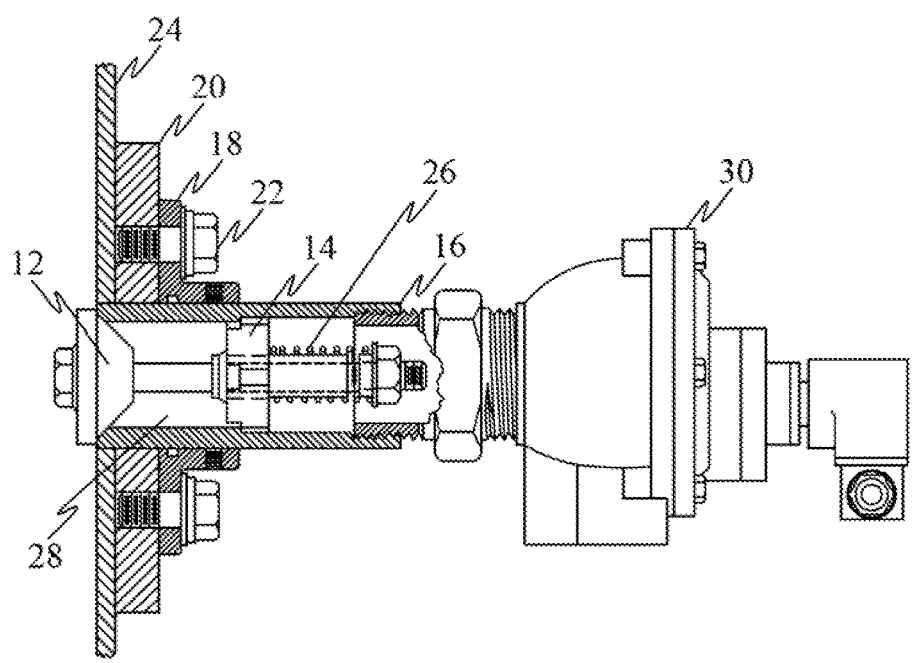
FIG. 1 is a side view partially in cross section for the previously described prior art gas powered discharge valve.

Referring now to FIG. 1 of the drawings, there is shown a side view partially in cross section for the previously described prior art gas powered discharge valve 10 now in commercial use. As can be noted, the depicted valve construction employs a multi-part metal piston member 12 as well as a multi-part metal piston guide member 14 and with both of the component parts having been fabricated with weldments as also formerly pointed out. The cylindrical valve construction further includes outer metal housing 16 which has been physically secured to a metal flange 18 that in turn has been fastened to metal mounting plate member 20 with conventional threaded bolts 22. As further shown in the present drawing, mounting plate member 20 has been affixed to storage vessel side wall 24 with additional weldments. A compression spring 26 disposed against the back end of piston guide member 14 keeps the valve closed until actuated by an admission of a pressurized gas to the hollow central passageway 28 of the valve construction. A conventional electric solenoid valve mechanism 30 supplies a pressurized gas medium, such as air and the like, to the back end of the central passageway to drive piston member 12 forward unsealing the front end of the passageway and releasing the pressurized gas to the interior of the storage vessel. For operation, the solenoid valve mechanism 30 can be attached to a compressed air supply line (not shown) and when pulsed normally for a ¼+L second time duration at gas pressures in the 40-100 psi range, the compression spring 26 is overcome and piston member 12 moves forward opening the discharge valve and releasing the pressurized gas in a full circle direction. Upon pulse termination, the internal spring member 26 immediately reseats the piston member blocking, mostly, any entry of granular material from the storage vessel into the inner valve body. Of particular note in the prior art device 10 is the flow of the pressurized gas is from the rear of the device thus requiring an open air channel from the rear of the device to the discharge valve opening. It can be appreciated that any particulate matter caught in the crevices of, for example, spring member 26, is likely to be blown into, and contaminate a storage vessel.

Figure 2:
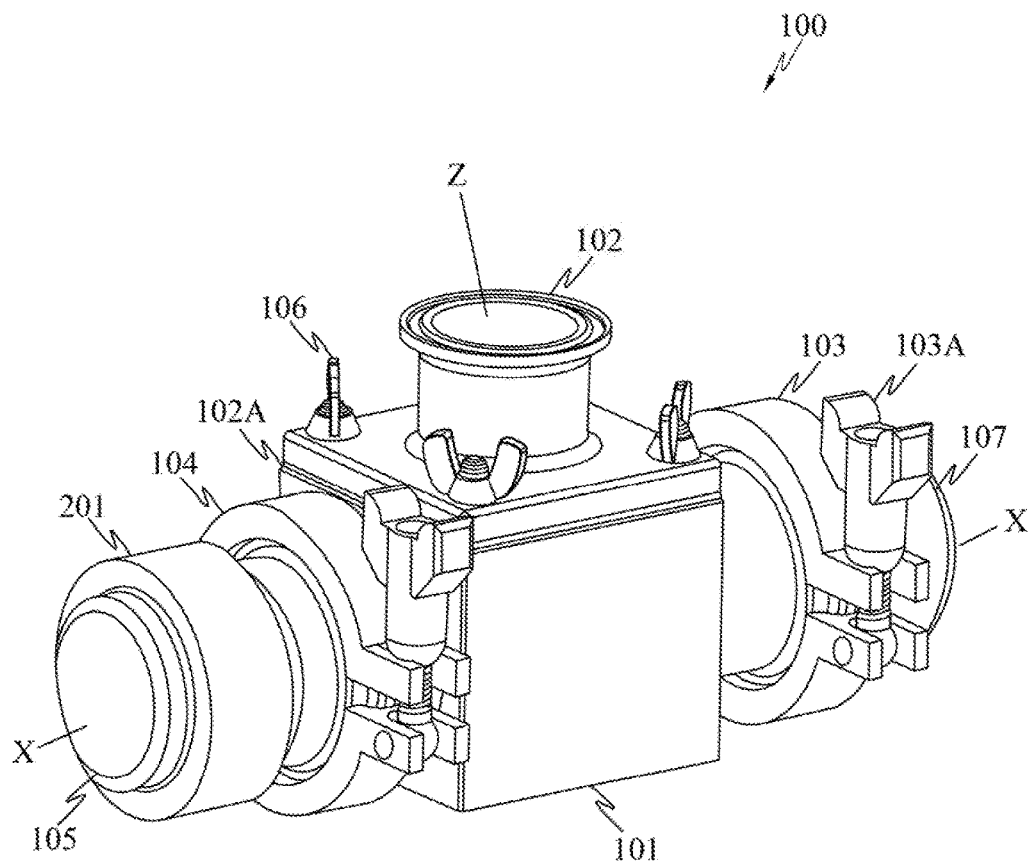
FIG. 2 is a perspective view of a sanitary high pressure aerator valve assembly in accordance with the present invention.

Referring also to FIG. 2 there is shown a perspective view of a sanitary high pressure aerator valve assembly 100. Shown in FIG. 2 is main body 101, inlet adaptor 102, inlet gasket 102A, end cap clamp 103, end clamp wing nut 103A, collar clamp 104, and collar clamp wing nut 104A. Also shown in FIG. 2 is enlarged piston head 105 and inlet adaptor wing nuts 106 (for clarity only one of the wing nuts is labeled).

Still referring to FIG. 2 it will be appreciated that inlet adapter 102 axis z is substantially perpendicular and coplanar to x-x axis of the high pressure aerator 100. It will be understood that inlet axis z may be any suitable angle 108 with respect to axis x-x and may be non-coplanar with axis x. Couplings, such as elbow couplings, (not shown) to inlet adapter 102 can be rotated for convenient positioning of solenoid valve (not shown), facilitating efficient maintenance of aerator 10 units, particularly those installed where accessibility is problematic, e.g., at higher elevations on a vessel, as well as provide greater installation flexibility with respect to the placement of air hoses. Inlet adaptor 102 also includes a sanitary connection flange such as a standard tri-clover flange 102A (shown in FIG. 7).

Also shown in FIG. 2 are quick release clamps 103, 104 and associated wing nuts 103A, 104A, which allow for a simplified installation and removal of the aerator valve 10. It will be appreciated that this feature is an advantage over prior art solutions which are often screwed into a threaded mounting coupling and tightened with lock nuts; thus requiring hand tools to install and remove aerator valve 10. Quick release clamps 103, 104 may be any suitable type of sanitary clamps such as, for example, tri-clover clamp assemblies.

Likewise, wingnuts 106 allow for quick installation and removal of inlet adaptor 102. Thus, applications requiring an inlet adaptor 102 having, for example, a 30 degree off y-axis inlet can be quickly connected to main body 101.

Figure 3:
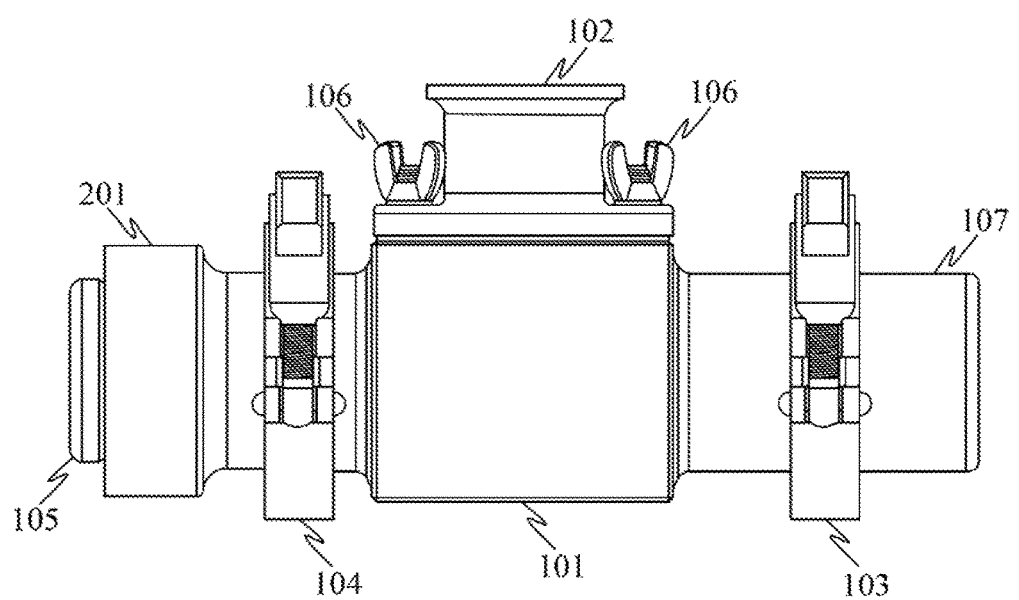
FIG. 3 is a side view of the sanitary high pressure aerator valve assembly in accordance with the present invention shown in FIG. 2.

Referring also to FIG. 3 there is shown a side view of the sanitary high pressure aerator valve 10 in accordance with the present invention shown in FIG. 2. FIG. 3 provides a clear side view of weld-on mounting collar 201. In practice, mounting collar 201 is welded to any holding vessel or equipment having metal walls. The main body 101 coupling end is inserted through the mounting collar 201 and coupled with mounting collar via collar clamp 104 and collar clamp wing nut 104A. In alternate embodiments mounting collar 201 may include a mounting flange. It will be appreciated that mounting collar 201 (with or without a mounting flange) may be affixed to vessel walls via any suitable means, for example, suitable adhesives or fasteners. It will also be understood that mounting collar 201 may be internally threaded for alternate coupling means.

Figure 4:
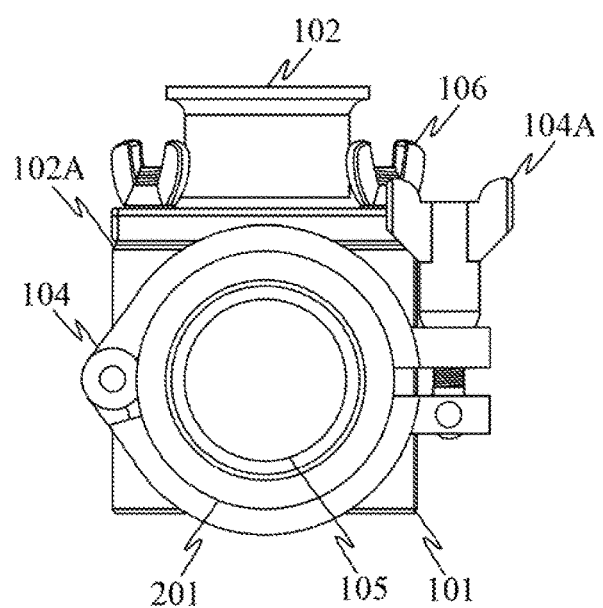
FIG. 4 is a valve end view of the sanitary high pressure aerator valve assembly in accordance with the present invention shown in FIG. 2.

Referring also to FIG. 4 there is shown a valve end view of the sanitary high pressure aerator valve 10 in accordance with the present invention shown in FIG. 2. It will be appreciated that the outside diameter of the enlarged piston head is suitably sized to allow the aerator assembly 10 with piston head 105 to slide through mounting collar 201.

Figure 5:
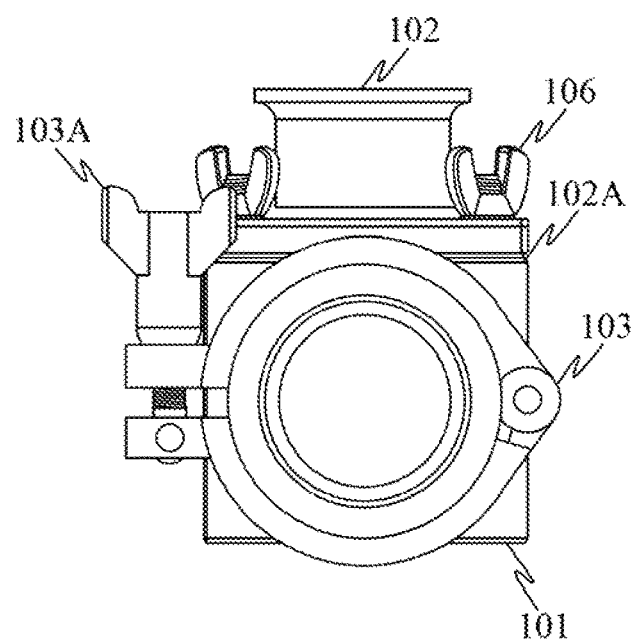
FIG. 5 is a cap end view of the sanitary high pressure aerator valve assembly in accordance with the present invention shown in FIG. 2.

Referring also to FIG. 5 there is shown a cap end view of the sanitary high pressure aerator valve 10 in accordance with the present invention shown in FIG. 2. End cap 107 is affixed to main body 101 via quick release clamp 103. Quick release clamp 103 allows end cap 107 to be quickly and easily installation and removal for access to removable parts for servicing. It will be appreciated the novel feature disclosed herein is advantageous over prior art designs, such as shown in FIG. 1, which require use of tools and multiple steps to remove and repair an aerator valve.

Figure 6:
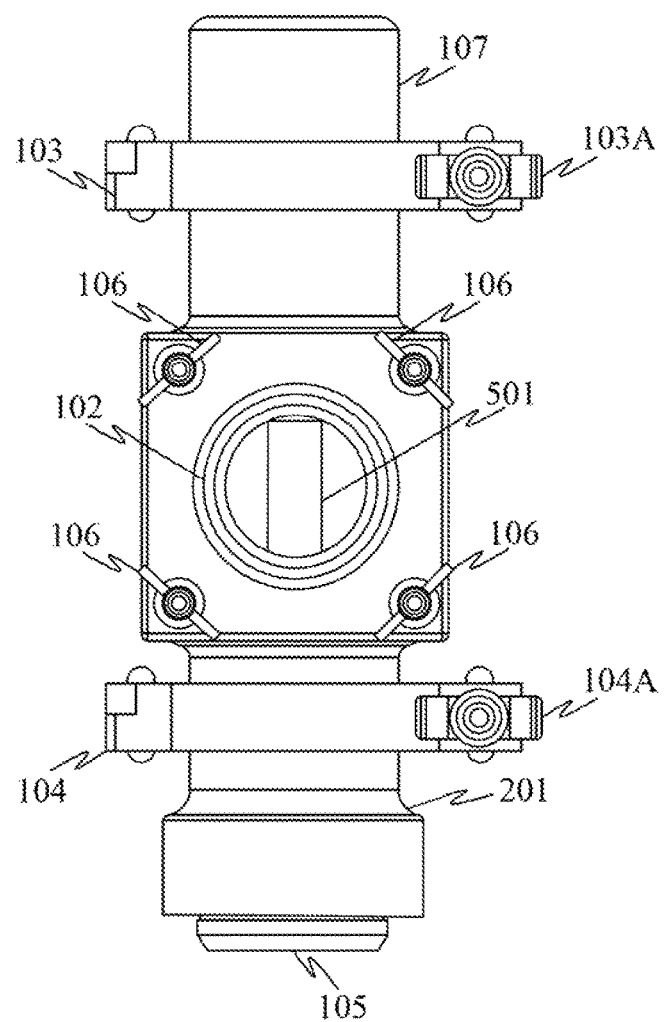
FIG. 6 is a top view of the sanitary high pressure aerator valve assembly in accordance with the present invention shown in FIG. 2.

Referring also to FIG. 6, there is shown a top view of the sanitary high pressure aerator valve 10 in accordance with the present invention shown in FIG. 2. Shown in FIG. 6 is a partial view of one-piece unitary metal piston 501, including enlarged piston head 105 shown previously. In alternate embodiments piston 501 may be any suitable piston type such as, for example, a multi-part piston; and may be fabricated from any suitable material such as stainless steel.

Figure 7:
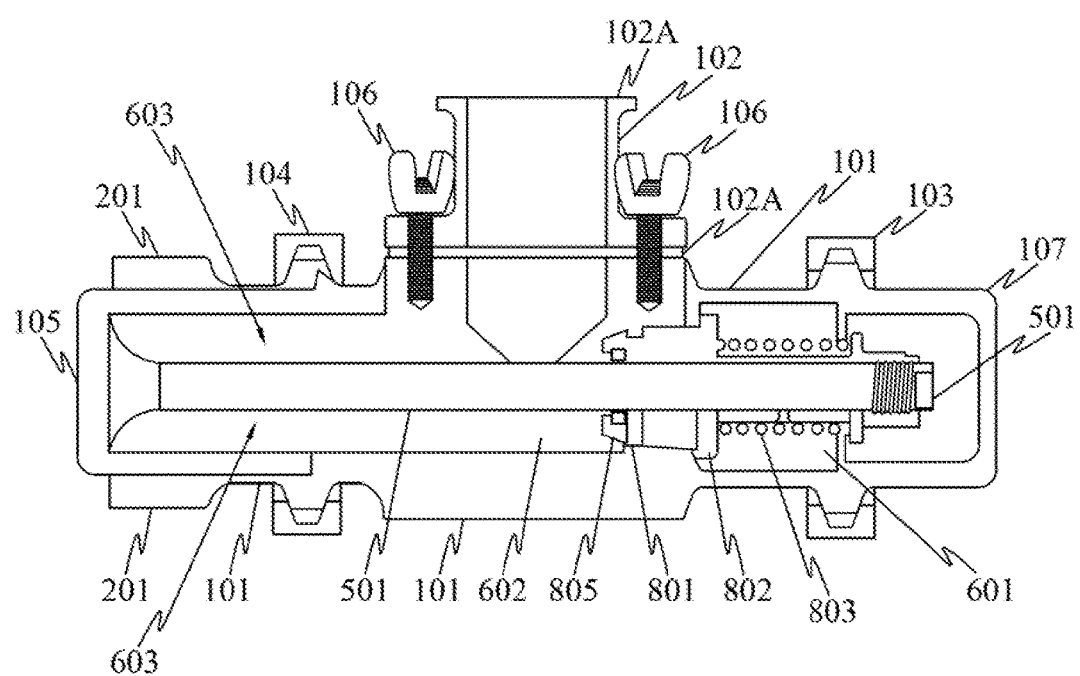
FIG. 7 is a partial cross section view of the sanitary high pressure aerator valve assembly in accordance with the present invention shown in FIG. 2.

Referring also to FIG. 7 there is shown a partial cross section view of the sanitary high pressure aerator valve 10 in accordance with the present invention shown in FIG. 2. Compression spring 803 disposed against the back end of piston guide member 802 keeps the enlarged piston head 105 closed or abutted against main body 101 until actuated by an admission of a pressurized gas 603 to the hollow central passageway 602 via inlet adaptor 102. Pressurized gas 603, such as air and the like, drives one-piece slidable unitary piston member 501 forward unsealing the front end of the passageway and releasing the pressurized gas 603 to the interior of the storage vessel (not shown) when the pressurized gas is sufficient to overcome compression spring 803 spring constant. Compression spring 803 may be any suitable size spring having a suitable spring constant. When pressurized gas 603 is terminated, the compression spring member 803 reseats the enlarged piston head 105 against main body 101 thereby blocking any entry of granular material from the storage vessel into the inner valve body. It will also be appreciated that in alternate embodiments the removal of pressurized gas 603 to central passageway 602 may be controlled to rapidly fall below the spring constant of compression spring 803 thereby allowing the enlarged piston head 105 to reseat against main body 101 while maintaining a positive, though decreasing, pressurized central passageway 602, to prevent entry of granular material into central passageway 602 as the piston head 105 reseats.

Still referring to FIG. 7, it will be appreciated that central passageway 602, piston 501, and beveled enlarged piston head 105 are aero dynamically shaped (e.g., no drag components) with respect to pressurized gas 603. Stated differently, there are no threaded components or other non-aerodynamic parts (e.g., nuts, bolts, springs) within the central passageway to be presented to pressurized gas 603 as in prior art solutions. This feature advantageously increases the effectiveness of gas flow and maintains sanitary conditions (e.g., no nooks or crannies for particles to lodge).

Still referring to FIG. 7, end cap 107 is removable from main body 101 via quick release end cap clamp 103. Removing end cap 107 allows access to isolation chamber 601 for servicing removable parts. It will be appreciated that isolation chamber is isolated from central passageway by an air chamber isolation assembly. Air chamber isolation assembly includes 602 by spring guide 802, at least one spring guide O-ring 801, and wiper seal 805 abutting the spring guide. It will be appreciated that isolating the isolation chamber 601 from central passageway 602 prevents material from contacting and lodging with threads, springs and crevices thus maintaining sanitary conditions.

Figure 8:
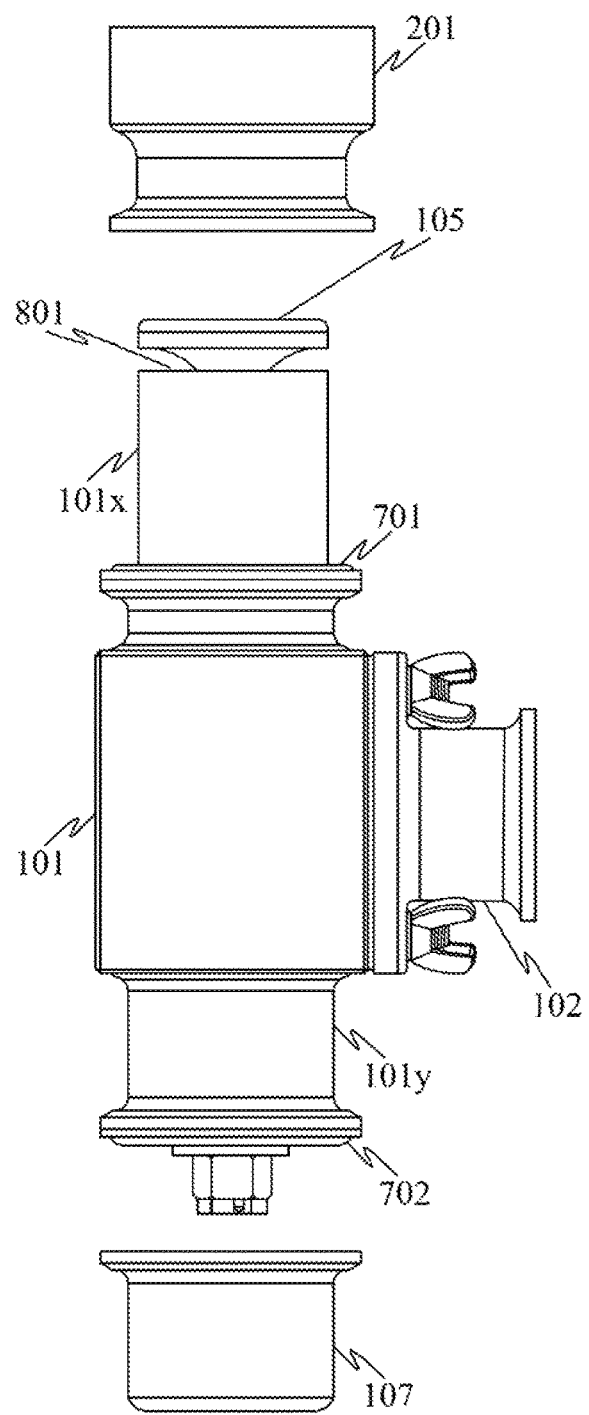
FIG. 8 is a partial disassembled side view of the sanitary high pressure aerator valve assembly in accordance with the present invention shown in FIG. 2.

Referring also to FIG. 8 there is shown a partial disassembled side view of the sanitary high pressure aerator valve assembly 100 in accordance with the present invention shown in FIG. 2. Shown in FIG. 8 is main body 101 having substantially coaxial opposite ends 101x and 101y. Herein the main body shall be referred to as the main body, inclusive of the substantially coaxial ends. Also shown in FIG. 8 is enlarged piston head 105 in the open position. It will be understood that coupling collar 201 slides over main body 101 to abut collar gasket 701 and is secured by collar clamp 104 shown earlier. Likewise, end cap 107 abuts end cap gasket 702 and is secured to main body 101 via end cap clamp 103.

Figure 9:
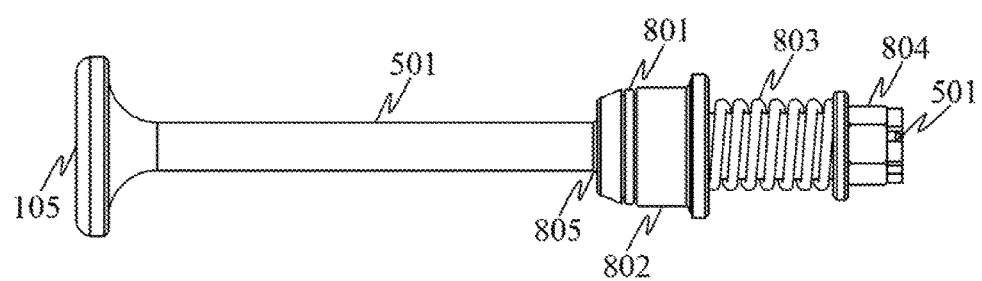
FIG. 9 is a side view of the piston valve assembly of the sanitary high pressure aerator valve in accordance with the present invention shown in FIG. 2.

Referring also to FIG. 9 there is shown a side view of the piston valve assembly of the sanitary high pressure aerator valve assembly 100 in accordance with the present invention shown in FIG. 2. Tension adjuster 804 adjusts tension applied to piston 501 by compression spring 803. Tension adjuster 804 may be any suitable tension adjuster such as a castellated or slotted nut.

Figure 10:
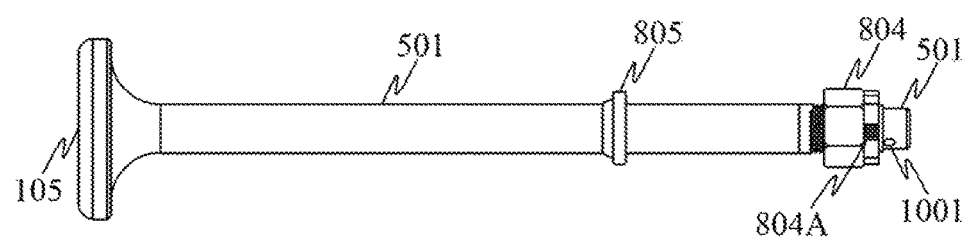
FIG. 10 is a side view of the piston valve assembly shown in FIG. 9 and in accordance with the invention shown in FIG. 2.

Referring also to FIG. 10 there is shown a side view of the piston valve assembly shown in FIG. 9 and in accordance with the invention shown in FIG. 2. Shown in FIG. 10 is threaded end 901 of metal piston 501 and wiper seal 805. As described earlier, wiper seal 805 isolates the isolation chamber 601 from central passageway 602. Wiper seal 805 may be any suitable material such as rubber or plastic. Also shown in FIG. 10 is tension spring hole 1001. Tension spring hole 1001 location on metal piston 501 is predetermined for desired spring tension when tension adjuster 804 is adjusted such that tension spring hole 1001 is visible through slot 804A. It will be further understood that the location of tension spring hole is predetermined as a function of the desired distance D (see FIG. 12), a spring constant associated with spring 803, and expected air pressure.

Figure 11:
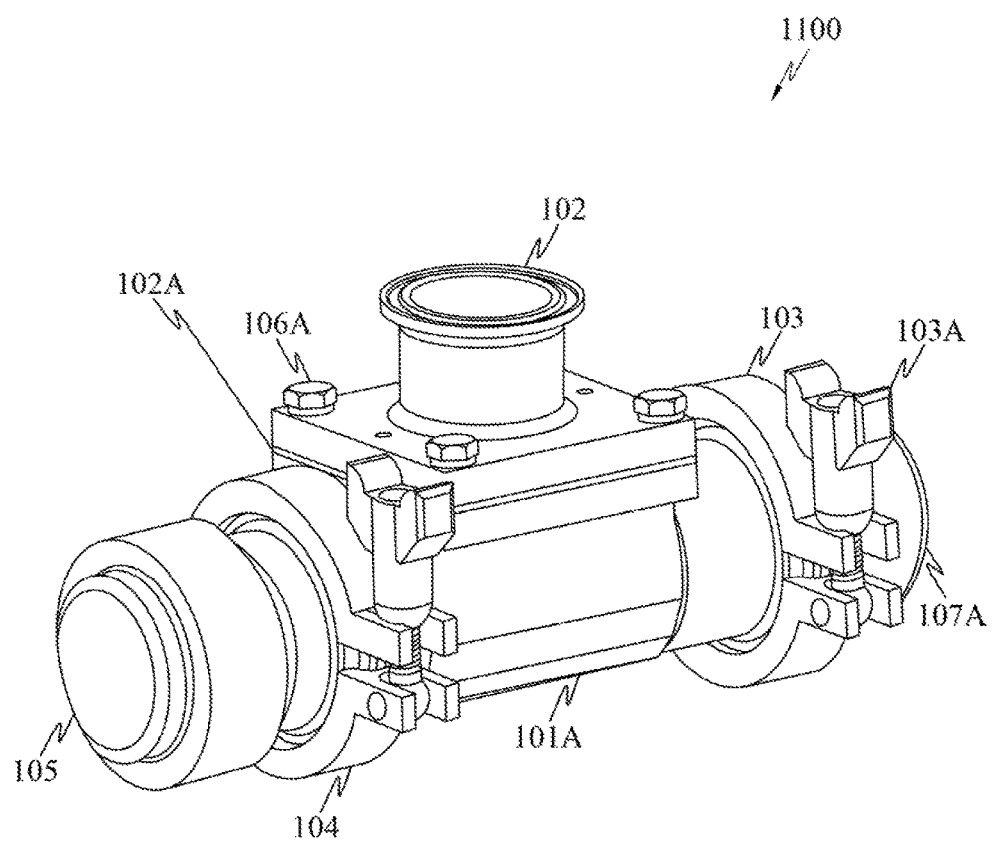
FIG. 11 is a perspective view of an alternative embodiment of the sanitary high pressure aerator valve assembly in accordance with the invention shown in FIG. 2.
Figure 11A:
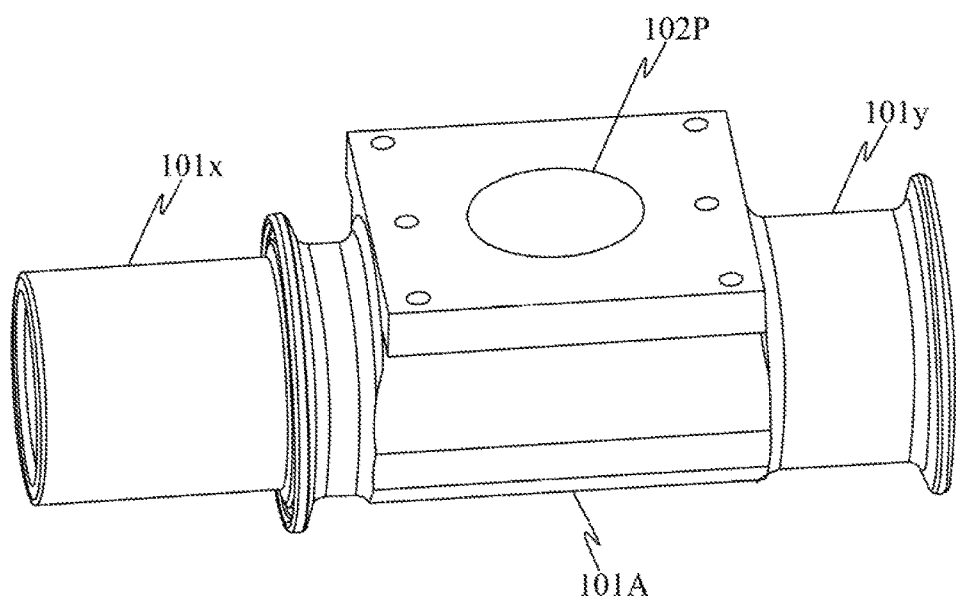
FIG. 11A is a perspective view of the main body in accordance with the invention shown in FIG. 2 and FIG. 1.

Referring also to FIG. 11 and FIG. 11A there is shown a perspective view of an alternative embodiment of the sanitary high pressure aerator valve assembly 1100, and main body, respectively, in accordance with the invention shown in FIG. 2. Shown in FIG. 11 is main body 101A, inlet adaptor 102, inlet gasket 102A, end cap clamp 103, end clamp wing nut 103A, collar clamp 104, and collar clamp wing nut 104A. Also shown in FIG. 11 is enlarged piston head 105 and inlet adaptor nuts 106A (for clarity only one of the wing nuts is labeled). Inlet adaptor 102 also includes a sanitary connection flange such as a standard tri-clover flange 102A (shown in FIG. 7). Inlet adapter 102 is secured to main body 101A inlet port 102P via nuts 106A (for clarity only one nut is labeled.) FIG. 1A shows the outlet port or coupling end, 101x and the cap end 101y of main body 101A. It will be appreciated that the outlet and cap end are substantially coaxial.

Also shown in FIG. 11 are quick release clamps 103, 104 and associated wing nuts 103A, 104A, which allow for a simplified installation and removal of the aerator valve 1100. It will be appreciated that this feature is an advantage over prior art solutions which are often screwed into a threaded mounting coupling and tightened with lock nuts; thus requiring hand tools to install and remove aerator valve 10. Quick release clamps 103, 104 may be any suitable type of sanitary clamps such as, for example, tri-clover clamp assemblies.

Figure 12:
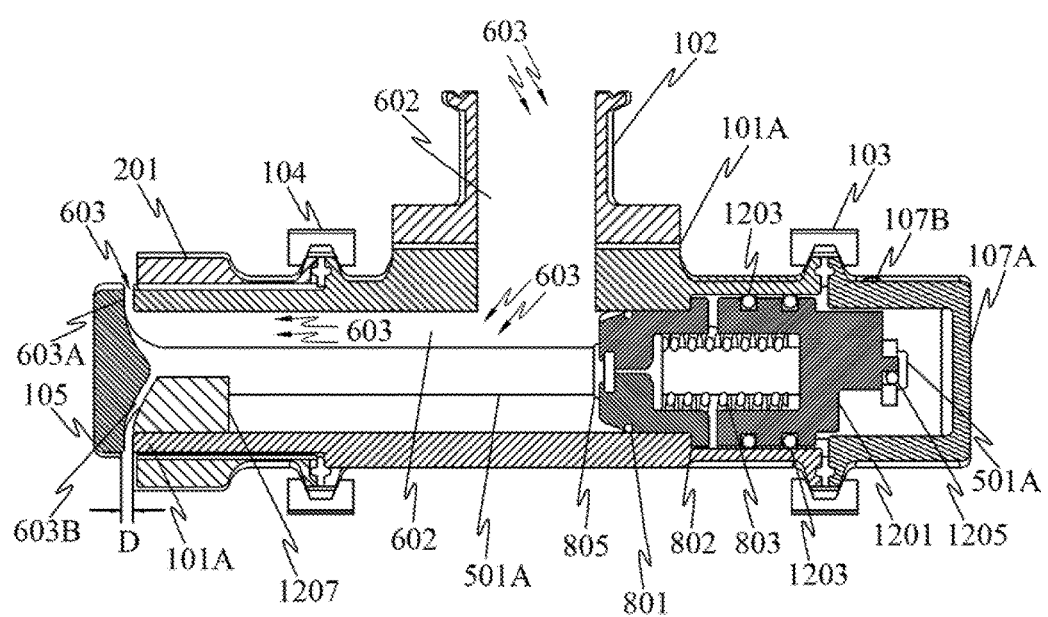
FIG. 12 is a partial cross section view of the sanitary high pressure aerator valve assembly in accordance with the present invention shown in FIG. 11.

Referring also to FIG. 12 there is shown a partial cross section view of the sanitary high pressure aerator valve assembly in accordance with the present invention shown in FIG. 11. Compression spring 803 disposed against the back end of piston guide member 802 keeps the enlarged piston head 105 closed or abutted against main body 101A until actuated by an admission of a pressurized gas 603 to the hollow central passageway 602. Pressurized gas 603, such as air and the like, drives slidable piston member 501A forward unsealing the front end of the passageway and creating a circular opening 603B between the enlarged piston head and the main body 101A. Directional adapter 1207, discussed herein, prevents the release of the pressurized gas 603 through sections, or arcs, of the circular opening 603B. The pressurized gas 603 is released via constrained opening 603A to the interior of the storage vessel (not shown) when the pressurized gas is sufficient to overcome compression spring 803 spring constant. It will be appreciated that the velocity of the escaping gas through constrained opening 603A is greater than if the escaping gas was allowed to escape throughout the circular opening 603B. It will be appreciated, as discussed herein, that directional adapter 1207 is pinned, or mated, to piston member 501A, and piston member 501A is rotatable on its axis via mated slotted assembly 1201 and that the direction of the escaping gas is selectable.

Still referring to FIG. 12, compression spring 803 may be any suitable size spring having a suitable spring constant. When pressurized gas 603 is terminated, the compression spring member 803 reseats the enlarged piston head 105 against main body 101 thereby blocking any entry of granular material from the storage vessel into the inner valve body. It will also be appreciated that in alternate embodiments the removal of pressurized gas 603 to central passageway 602 may be controlled to rapidly fall below the spring constant of compression spring 803 thereby allowing the enlarged piston head 105 to reseat against main body 101 while maintaining a positive, though decreasing, pressurized central passageway 602, to prevent any entry of granular material into central passageway 602 as the piston head 105 reseats.

Still referring to FIG. 12, it will be appreciated that central passageway 602, piston 501A, and beveled enlarged piston head 105 are aero dynamically shaped (e.g., no drag components) with respect to pressurized gas 603. Stated differently, there are no threaded components or other non-aerodynamic parts presented to pressurized gas 603 as in prior art solutions. This feature advantageously increases the effectiveness of gas flow and maintains sanitary conditions (e.g., no nooks or crannies for particles to lodge).

Still referring to FIG. 12, modified end cap 107A is removable from main body 101A via quick release end cap clamp 103. Removing end cap 107A allows access to isolation chamber 601 for servicing removable parts. It will be appreciated that isolation chamber is isolated from central passageway 602 by spring guide 802, spring guide O-ring 801, and wiper seal 805. It will be appreciated that isolating the isolation chamber 601 from central passageway 602 prevents material from contacting and lodging with threads, springs and crevices thus maintaining sanitary conditions.

Also shown in FIG. 12 is slotted tensioner 1201, o-rings 1203, and pin 1205. O-rings 1203 and 801 may be any suitable o-ring such as a TEFLON (PTFE) o-rings. Slotted tensioner 1201 and pin 1205 are discussed further herein.

Figure 13:
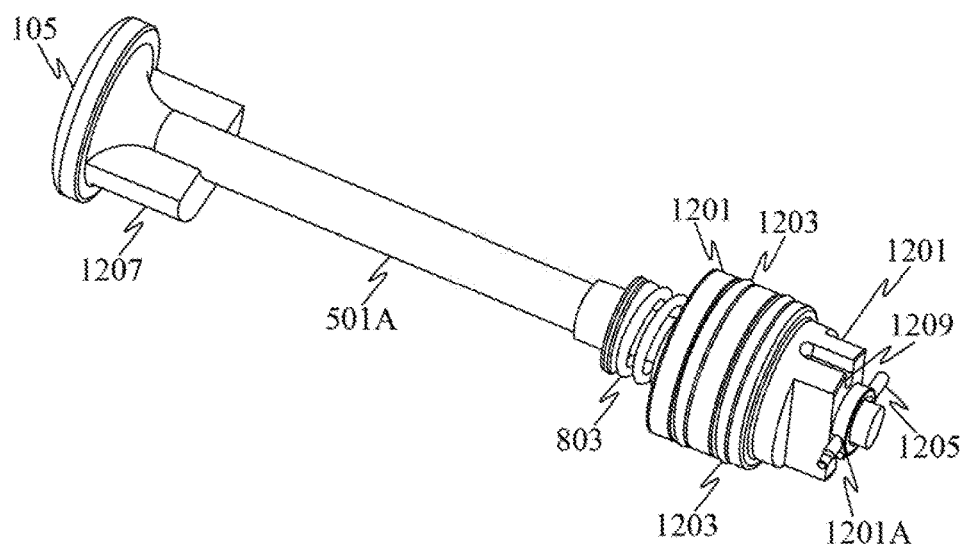
FIG. 13 is a side view of the piston valve assembly of the sanitary high pressure aerator valve in accordance with the present invention shown in FIG. 12.
Figure 14:
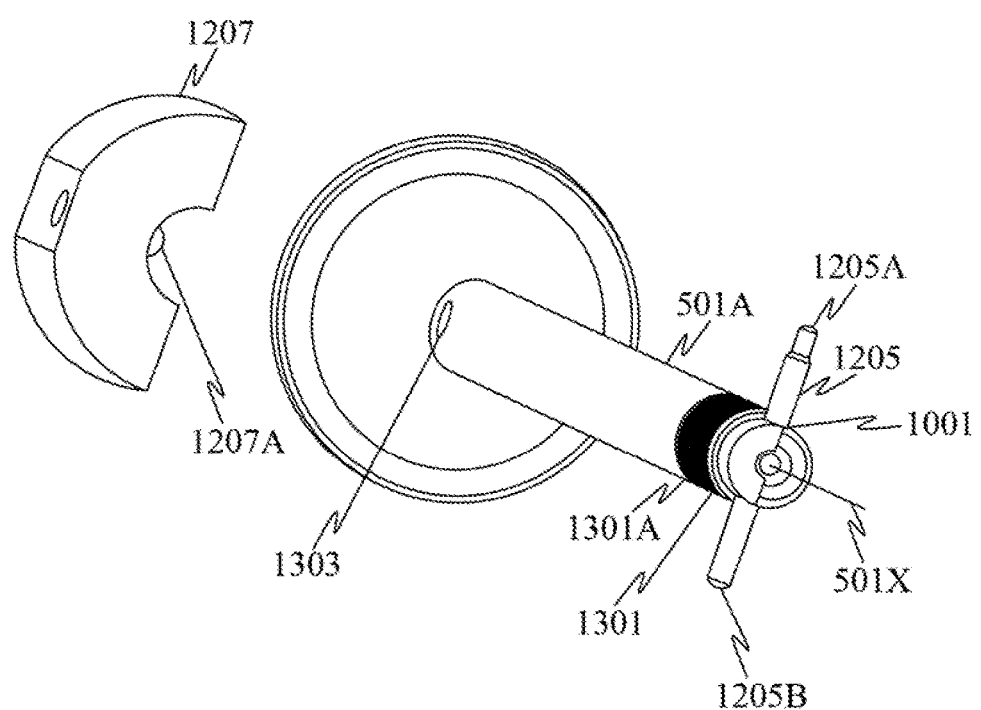
FIG. 14 is a rear perspective view of the piston valve assembly of the sanitary high pressure aerator valve in accordance with the present invention shown in FIG. 12.

Referring also to FIG. 13 and FIG. 14, there is shown a side view of the piston valve assembly and a rear perspective view of the piston valve assembly, respectively, of the sanitary high pressure aerator valve in accordance with the present invention shown in FIG. 12. Threaded slotted tensioner 1201 is turned on piston 501A until compression spring 803 is compressed to the desired tension (e.g., hole in piston 501A is visible as discussed earlier.) When hole in piston 501A is visible pin 1205 is inserted through hole and slots 1201A. As discussed earlier the hole in piston 501A is predetermined such that the distance D (shown in FIG. 12) between enlarged piston head 105 and main body 101A is a specified distance as a function of the air pressure and the spring 803 tension (shown in FIG. 12). For example, the hole can be located on piston 501A such that the distance D is 0.125 inches for a given, or predetermined, spring constant associated with compression spring 803 and expected air pressure. Similarly, slotted tensioner 1201 may be turned on piston 501A threads 1301 until the tensioner bottoms out at the end of the threads 1301A. The end of the threads, or thread length, 1301A may be predetermined such that the distance D is 0.093 inches for a given spring constant and air pressure.

Also shown in FIG. 14 is directional adapter 1207 and adapter pin 1207A. Directional adapter 1207 may be any suitable circumference such as 90 degrees, 120 degrees, 150 degrees, or 180 degrees. It will be appreciated that the directional adapter blocks pressurized gas 603 from exiting certain sections of the opening 603B thereby directing the escaping gas 603 through the unblocked sections (e.g., 603A shown in FIG. 12) and that the direction of escaping gas 603 is selectable. For example, if the directional adapter 1207 is blocking 180 degrees of the opening 603B then the remaining opening for the gas 603 to escape is 180 degrees.

Still referring to FIG. 14, there is shown detent 1303 in piston 501A. Detent 1303 is sized to receive directional adapter pin 1207A thus allowing directional adaptor to be mated with piston 501A. Piston 501A, and directional adapter 1207, may be rotated to point the escaping gas 603.

Figure 15:
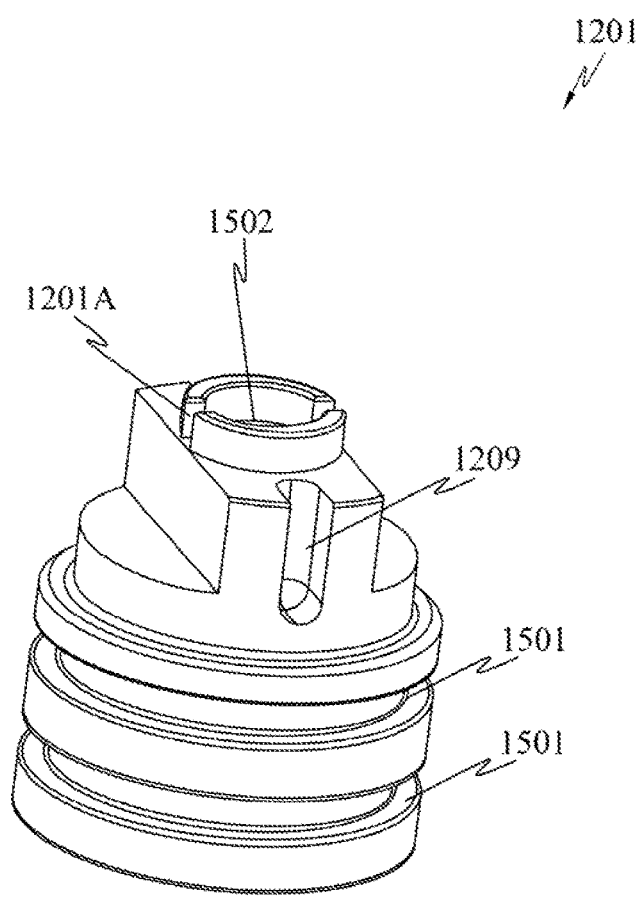
FIG. 15 is a side perspective view of the slotted tensioner assembly in accordance with the present invention shown in FIG. 12.
Figure 16:
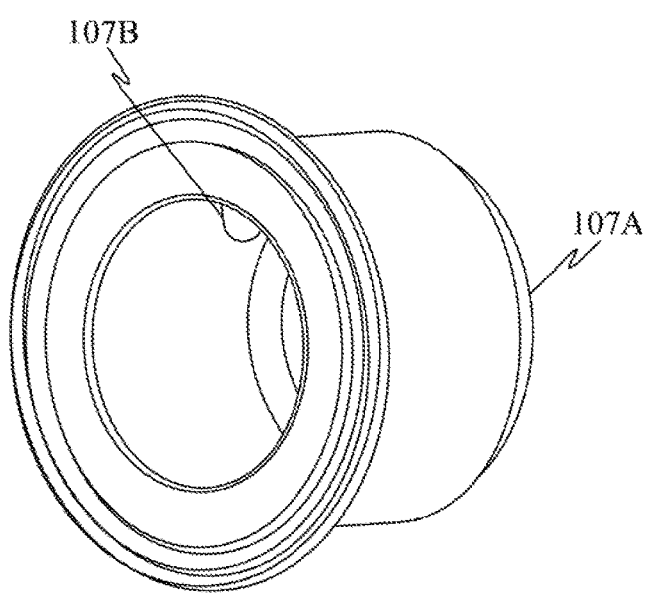
FIG. 16 is a perspective view of the modified end cap in accordance with the present invention shown in FIG. 12.

Referring also to FIG. 15 and FIG. 16, there is shown a side perspective view of the slotted tensioner 1201 assembly and a perspective view of the modified end cap 107A, respectively, in accordance with the present invention shown in FIG. 12. Slotted tensioner 1201 includes alignment, or directional grooves, 1209, for mating with end cap pin 107B, O-ring groves 1501, and internal threads 1502. It will be understood that slotted tensioner is threadably mateable with piston member 501A threaded end (see FIG. 14-1301) and is pinned, or mated, to slotted tensioner 1201 with pin 1205 through hole 1001 and through slots 1201A and is rotatable around the piston member axis 501X. It will be further appreciated that end cap pin 107B mated with directional grooves 1209 turns the slotted tensioner 1201, the piston member 501A, and the directional adapter 1207 as a single unit. It will be further appreciated that end cap pin 107B mated with directional grooves 1209 prevents the slotted tensioner 1201, the piston member 501A, and the directional adapter 1207 from rotating when modified end cap 107A is secured to main body 101 via end clamp 103 (see FIG. 12).

It should be understood that the foregoing description is only illustrative of the invention. Thus, various alternatives and modifications can be devised by those skilled in the art without departing from the invention. Accordingly, the present invention is intended to embrace all such alternatives, modifications and variances that fall within the scope of the appended claims.

What is claimed is:

1. A sanitary high pressure aerator valve assembly comprising:
   a main body having substantially coaxial opposite ends;
   a coupling collar attachable to one end of the substantially coaxial opposite ends;
   an end cap attachable to the end opposite of the coupling collar end;
   an inlet adaptor attachable to the main body, wherein the inlet adaptor is substantially perpendicular to the substantially coaxial opposite ends;
   an air chamber comprising a central passageway disposed between the inlet adaptor and the coupling collar end, wherein there are no non-aerodynamic parts disposed within the central passageway;
   an air chamber isolation assembly for isolating the central passageway from the end opposite of the coupling collar end, and forming an isolation chamber, wherein the air chamber isolation assembly comprises:
a spring guide;
a spring guide O-ring disposed around the spring guide; and
a wiper seal abutting the spring guide; further comprising a one-piece unitary piston member slidable for a predetermined distance within a portion of the central passageway coaxial with the main body coaxial ends; and wherein the one-piece unitary piston member comprises: an enlarged head disposed at one end of the one-piece unitary piston member for sealing the coupling collar end of the air chamber; and a threaded length end disposed at an end opposite the enlarged head end: and wherein the threaded end is isolated from the central passageway by the air chamber isolation assembly.

2. The sanitary high pressure aerator valve as in claim 1 further comprising a compression spring coaxial with the one-piece unitary piston member and having a predetermined spring constant.

3. The one-piece unitary piston member as in claim 2 wherein the one-piece unitary piston member further comprises a tension spring hole, wherein the location of the spring tension hole is predetermined as a function of the spring constant, air pressure, and a first predetermined distance.

4. The one-piece unitary piston member as in claim 3 wherein the first predetermined distance is 0.125 inches.

5. The one-piece unitary piston member as in claim 2 wherein the length of threaded end is predetermined as a function of the spring constant, air pressure, and a second predetermined distance.

6. The one-piece unitary piston member as in claim 5 wherein the second predetermined distance is 0.093 inches.

7. The sanitary high pressure aerator valve as in claim 1 further comprising a slotted tensioner for adjusting tension of the compression spring.

8. A directional sanitary high pressure aerator valve assembly comprising:
a main body comprising:
an outlet port, wherein the outlet port comprises a circular opening;
a cap end;
an inlet port;
wherein the outlet port and the cap end are substantially coaxial;
an air chamber comprising a central passageway disposed between the inlet port and the outlet port wherein the air chamber comprises:
a spring guide;
a spring guide O-ring disposed around the spring guide; and
a wiper seal abutting the spring guide; and
a directional adapter, wherein the directional adapter is disposed towards the outlet port within the central passageway; a one-piece unitary piston member slidable for a predetermined distance within a portion of the central passageway coaxial with the outlet port and the cap end, and wherein the one-piece unitary piston member is mateable with the directional adapter; the one-piece unitary piston member further comprising: an enlarged head disposed at one end of the one-piece unitary piston member for sealing the outlet port of the air chamber, a threaded length end disposed at an end opposite the enlarged head end, and wherein the threaded length end is isolated from the central passageway by an air chamber isolation assembly.

9. The directional adapter as in claim 8, wherein the directional adapter is adaptable to blocking a predetermined circular arc of the outlet port.

10. The directional adapter as in claim 9 wherein the predetermined circular arc is 180 degrees.

11. The directional sanitary high pressure aerator valve assembly as in claim 8 further comprising:
a threaded slotted tensioner, wherein the slotted tensioner:
at least one O-ring groove;
at least one directional groove;
at least one slot; and
wherein the slotted tensioner is threadably mateable with the one-piece unitary piston member threaded length end.

12. The one-piece unitary piston member as in claim 11 wherein the one-piece unitary piston member further comprises a tension spring hole, wherein the location of the spring tension hole is predetermined as a function of the spring constant, air pressure, and a first predetermined distance.

13. The directional sanitary high pressure aerator valve assembly as in claim 11 wherein the one-piece unitary piston member, the threaded slotted tensioner, and the directional adapter are mateable to rotate as one unit around a common axis.

14. The directional sanitary high pressure aerator valve assembly as in claim 11 further comprising an end cap wherein the end cap comprises an end cap pin mateable with the at least one directional groove.

15. A sanitary high pressure aerator valve assembly comprising:
a main body comprising:
an outlet port, wherein the outlet end comprises a circular opening;
a cap end;
an inlet port;
wherein the outlet end and the cap end are substantially coaxial;
an air chamber comprising a central passageway disposed between the inlet port and the outlet port; and
wherein there are no non-aerodynamic parts disposed within the central passageway,
an air chamber isolation assembly for isolating the central passageway from the cap end, wherein the air chamber isolation assembly comprises:
a spring guide;
a spring guide O-ring disposed around the spring guide; and
a wiper seal abutting the spring guide;
a one-piece unitary piston member slidable for a predetermined distance within a portion of the central passageway coaxial with the main body coaxial ends; and
wherein the one-piece unitary piston member comprises:
an enlarged head disposed at one end of the one-piece unitary piston member for sealing the coupling collar end of the air chamber; and
a threaded length end disposed at an end opposite the enlarged head end; and
wherein the threaded end is isolated from the central passageway by the air chamber isolation assembly.

16. The one-piece unitary piston member as in claim 15 wherein the one-piece unitary piston member further comprises a tension spring hole.

* * * * *